Feb. 16, 1960     L. K. LOEHR     2,925,264
TORSION SPRING SUSPENSION FOR WHEELED VEHICLES
Filed Feb. 18, 1957     2 Sheets-Sheet 2
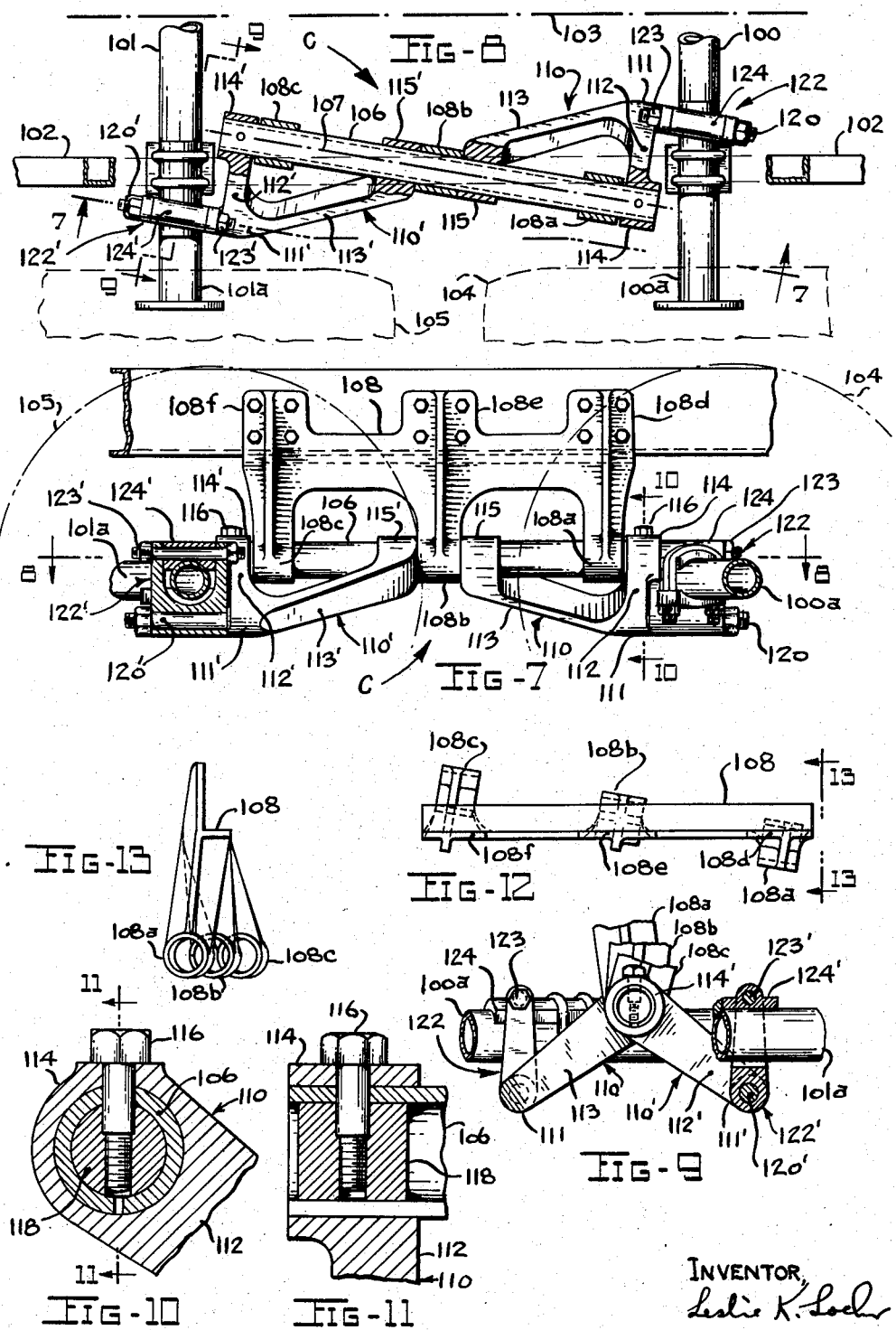
INVENTOR,
Leslie K. Loehr

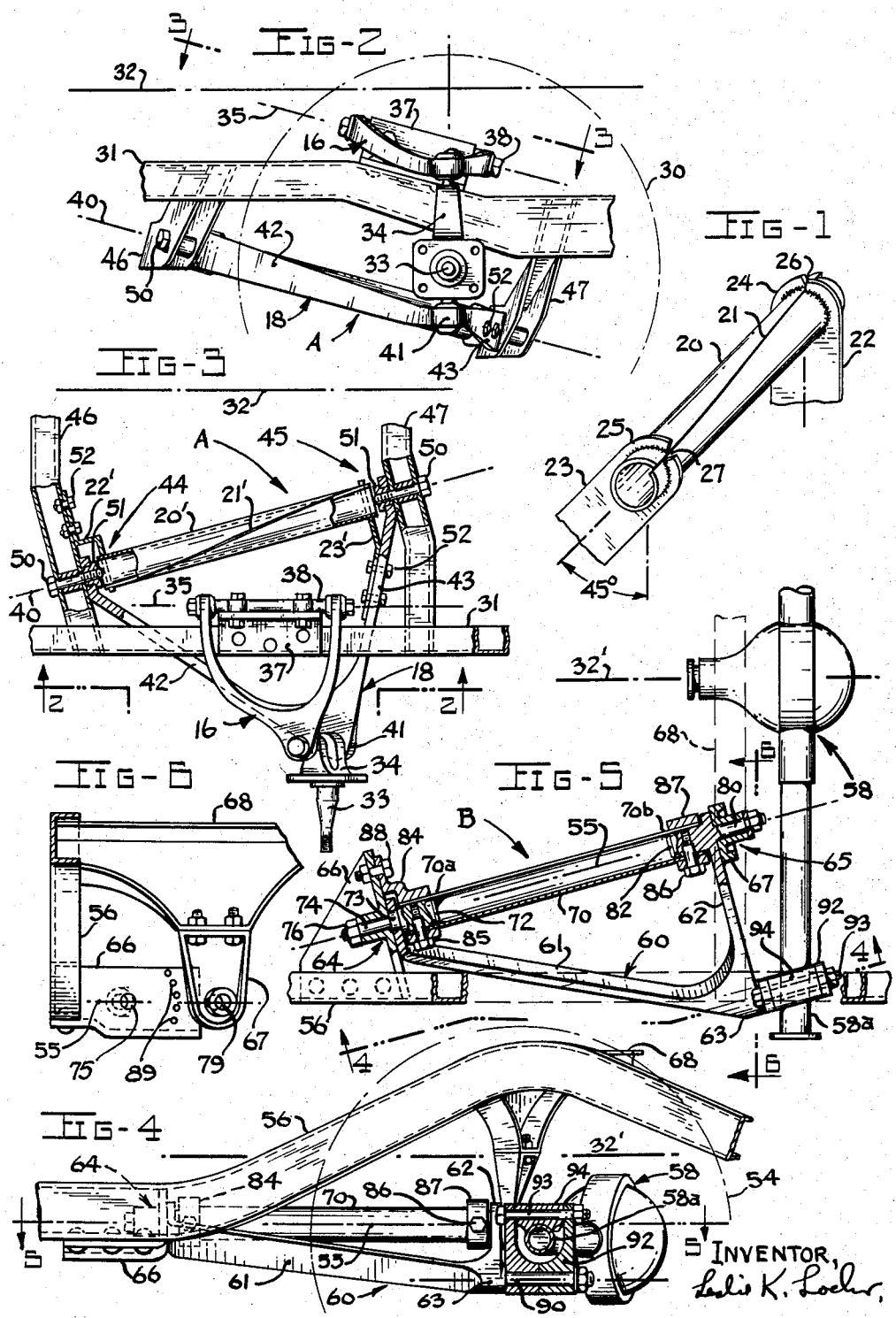

1

United States Patent Office 2,925,264
Patented Feb. 16, 1960

2,925,264

TORSION SPRING SUSPENSION FOR WHEELED VEHICLES

Leslie K. Loehr, Los Angeles, Calif.

Application February 18, 1957, Serial No. 640,658

12 Claims. (Cl. 267—57)

This invention relates generally to spring suspension systems for wheeled vehicles, and in particular, to torsion spring suspension systems adaptable for use with front and/or rear wheel-supporting axles employed in wheel-borne vehicles.

It has become a universally accepted practice to construct the front suspension systems of present day automobiles such that each front wheel is separately suspended for independent spring action relative to the frame. The structure most commonly employed to provide a suspension system of this character comprises a pair of generally triangular members pivotally connected to the chassis frame in spaced relationship one above the other such that the apexes of the upper and lower members cooperate to support a steering knuckle with its wheel spindle in proper position. The top member is customarily referred to as the upper control arm, while the bottom member is called the lower control or spring arm since a coiled spring is interposed between this lower arm and the chassis frame so that forces resulting from the weight of the automobile are transmitted through the spring to the wheel via the apex of the lower frame and steering knuckle.

Recent improvements in this structure have substituted the action of a torsion spring for the action of the coiled spring; that is, the coiled spring was replaced by a torsion spring functionally associated with the lower control arm such that forces resulting from the weight of the automobile are twistingly applied to the torsion spring. Although it is generally known that torsion springs improve the riding qualities of an automobile, the structure normally required for a spring of this type involves the use of chassis space extending a considerable distance lengthwise of the frame; in other words, because of the length required for a solid bar torsion spring to provide adequate deflection, the torsion spring extends outside the confines of the upper and lower control arms.

The present invention contemplates a spring suspension system for a wheeled vehicle whereby the driving wheels and the dirigible wheels are connected to the vehicle frame by means of generally triangular-shaped structures designed such that one side of each structure includes a split-walled tubular spring constructed and supported according to the teachings set forth in U.S. patent application Serial No. 591,989 filed June 18, 1956. Stated differently, each triangular-shaped structure having a split-walled tubular side, is connected to the vehicle frame such that the tubular side constitutes a torsionally resilient spring, and such that the longitudinal axis of each tubular side constitutes a hinging axis extending lengthwise of the vehicle frame, about which the triangular-shaped structure swings in producing the spring suspension effect. Thus, in transferring the weight of the vehicle to the wheels, the triangular-shaped structures are not only rotated with respect to the vehicle frame, but such rotation is effective for applying twisting forces to the split-walled tubular side of each triangular structure.

Accordingly, it is not only an object of the present invention to provide torsion spring suspension means for a load-carrying wheeled vehicle, but it is also an object to provide such means wherein an optimum of sprung weight of the vehicle is transferred to the vehicle wheels through torsional forces applied to split-walled tubular elements associated with simple force-transmitting structures connecting such wheels to the load-carrying portion of the vehicle. It is also an object to provide such means wherein a portion of each force-transmitting structure is associated with a tube-like spring element having a cylindrical wall characterized by a slot extending longitudinally the full length of said wall, and with the load-carrying portion of the vehicle such that the weight supporting function of a wheel applies torsional forces to the split-walled tubular element, and such that reaction forces resulting from wheel braking and/or wheel driving are directly absorbed by the load-carrying structure without causing relative movement between the wheel and load-carrying structures.

It is also an object to provide such spring suspension means which precludes the storage of energy in the suspension spring element when braking or driving forces are applied to the vehicle wheels.

It is another object to provide a force-transmitting structure for the spring suspension system of a wheeled vehicle, in which a portion of this structure is associated with the axle of a wheel, and other portions of the structure are associated with a torsionally resilient split-walled tube and the vehicle frame such that vehicle weight is transferred to the wheel as twisting forces applied to the split-walled tube. It is also an object to provide a structure of this character which is particularly adapted for independent association with each of the dirigible wheels of an automobile.

It is an additional object to provide triangular structures particularly adapted for use in torsion spring suspension systems of wheeled vehicles having dual wheel axles situated in spaced tandem relationship, and to provide such a structure wherein a single split-walled tubular element is not only effective as a spring for both axles but is especially effective in equalizing the loads transmitted from the vehicle frame to said axles.

It is another object to provide a torsion spring suspension system for dual axles of a load-carrying wheeled vehicle, in which a split tubular spring element is associated with the vehicle load-carrying structure and the dual axles such that the weight of the load-carrying structure is not only transmitted to the axles through twisting forces applied to the ends of the spring element, but is transmitted such that both axles are loaded equally for equal distribution of the weight to the wheels.

It is a further object to provide a spring suspension system wherein the movement of the wheel spindles or axles relative to the frame or body of a vehicle may be confined to a generally vertical plane extending transversely of the vehicle such as to provide the advantage of a trailing relationship between the wheels and the vehicle frame, and the advantages of absorbing brake torque and driving torque in the vehicle frame without producing forces in the spring tending to influence the position of the frame relative to the spindles and axles when brake and/or driving forces are applied to the wheels.

The novel features of this invention, together with further objects and advantages thereof, will be better understood from the following description considered in connection with the accompanying drawings in which embodiments of the invention are illustrated by way of example. It is expressly understood, however, that the drawings are for the purpose of illustration and description only, and are not intended as a definition of the limits of the invention.

In the drawings:

Fig. 1 is an oblique view of a tubular spring element embodied in this invention;

Fig. 2 is a side elevation of an automobile left-front-wheel suspension constructed according to this invention;

Fig. 3 is a combination plan and sectional view of the left-front-wheel suspension system in Fig. 2 taken on line 3—3;

Fig. 4 is a side elevation of an automobile left-rear-wheel suspension system constructed according to this invention;

Fig. 5 is a combination plan and sectional view of the left-rear-wheel suspension system in Fig. 4, taken on line 5—5;

Fig. 6 is an end view taken on line 6—6 of Fig. 5 showing the brackets for attaching the suspension system to the automobile frame;

Fig. 7 is a view showing a side elevation of a dual or tandem axle suspension system constructed according to this invention taken on line 7—7 of Fig. 8;

Fig. 8 is a sectional view taken on line 8—8 of Fig. 7;

Fig. 9 is an end view taken on line 9—9 of Fig. 8;

Fig. 10 is a sectional view taken on line 10—10 of Fig. 7;

Fig. 11 is a sectional view taken on line 11—11 of Fig. 10;

Fig. 12 is a plan view of the bracket used in Fig. 7 for connecting the spring system to the vehicle frame; and Fig. 13 is a view taken on line 13—13 of Fig. 12, showing an end elevation of the bracket.

The torsion spring embodied in this invention and illustrated generally in Fig. 1 comprises a tubular element 20 of spring material in which the generally cylindrical wall of the element is longitudinally severed throughout its length by a slot 21 whereby torsional flexibility of the element is effectively increased to a magnitude greatly exceeding the flexibility of a solid-walled tube of similar dimensions. As illustrated, element 20 is in a torsionally stressed or twisted condition of 45 degrees resulting from twisting forces applied at right angles to the element axis by torque arms 22 and 23 having portions circumaxially embracing the ends of the element such as to provide radial ribs or flanges 24 and 25 welded to the element wall, which ribs or flanges are made discontinuous by openings 26 and 27 radially aligned with slot 21. This structure for applying twisting forces to element 20 not only preserves the torsional flexibility of the element in the regions of the flanges, but it also provides radial rigidity to prevent radial spreading of the element wall in the regions where the twisting forces are applied.

In Figs. 2 and 3 there is illustrated an independent wheel suspension assembly adapted for use with the front wheels of an automobile, which incorporates a spring suspension system identified by reference letter A having a torsion spring similar in structure and function to spring element 20 of Fig. 1. In this assembly upper and lower control arms 16 and 18 connect a left-front wheel schematically represented by line 30, to a vehicle frame having a left-front side portion 31 and a longitudinal axis 32. As shown, wheel 30 is mounted on a spindle 33 of a steering knuckle 34 supported for the vehicle steering function by arms 16 and 18 according to prior art teachings; while the control arms themselves are hinged to the vehicle frame about respective axes 35 and 40 extending lengthwise of the vehicle frame such that up and down movement of steering knuckle 34 relative to the frame is confined to a generally vertical plane extending transversely of said frame.

The hinged relationship of arm 16 to the vehicle frame about axis 35 is effected in any well known manner such as by means of a bracket 37 securely attached to the frame on top of front-side portion 31 and a hinge pin 38 adjustably supported by the bracket. It is to be noted that axis 35 is coincident with the axis of the hinge pin, and that the coincident axes are purposely sloped downwardly toward the rear of the frame as seen in Fig. 2 to promote a trailing condition to be described later.

For purposes of description, control arm 18 will hereinafter be referred to as suspension member 18; hence, according to this invention spring suspension system A is a generally triangular structure comprising a suspension member 18 having a pair of divergent pivot arms 42 and 43 extending from a suitable connection 41 with steering knuckle 34 to spaced-apart pivotal connections 44 and 45 with crossmembers 46 and 47 of the vehicle frame, and a split-walled tubular spring element 20' disposed between these pivotal connections. As shown, spring element 20' and pivotal connections 44 and 45 are arranged such that the longitudinal axis of the spring element and the pivotal axes of the connections are coincident with axis 40. It is also to be noted that the ends of the spring element are respectively connected to crossmember 46 and pivot arm 43 by torque arms 22' and 23', constructed similar to arms 22 and 23 described in connection with Fig. 1, such that pivotal or swinging movements of suspension member 18 about pivotal connections 44 and 45 are effective for causing torsional deflection of tubular spring element 20' about axis 40. In other words, when loads resulting from the weight of the vehicle are supported by a wheel 30 mounted on spindle 33, such loads are resolved as forces applied to suspension member 18 by steering knuckle 34 at connection 41 such as to cause suspension member 18 to rotate upwardly about axis 40 toward frame portion 31 in direct proportion to the torsional deflection produced in spring element 20' by torque arms 22' and 23'.

As illustrated in Figs. 2 and 3, the pivotal connections 44 and 45 between arms 42 and 43 and frame crossmembers 46 and 47, respectively, are effected by conventional means such as bolts 50 extending through reinforced openings in the crossmembers, and nuts 51 constructed to provide rotatable engagements with bores in the distal ends of arms 42 and 43 when the bolt and nut combinations are firmly secured to the crossmembers. In addition to the fact that axis 40 is coincident with or common to the axes of pivotal connections 44 and 45, it is also angularly disposed with respect to the longitudinal axis 32 of the vehicle frame. As seen in Fig. 2, axis 40 slopes downwardly with respect to axis 32 from crossmember 46 to crossmember 47; while in Fig. 3 it slopes upwardly with respect to axis 32 from crossmember 46 to crossmember 47. Stated differently, axis 40 slopes downwardly from the front of the frame to intersect a ground plane supporting wheel 30, and inwardly from the left-front side of the frame to intersect a vertical plane extending through axis 32.

The canted or sloped conditions of axes 35 and 40 with respect to the longitudinal axis 32 of the vehicle frame produce a trailing relationship of wheel 30 with respect to the frame whereby the forces of motion, as the vehicle moves forwardly, act to pull the wheel over the ground plane or surface of a roadway. This trailing relationship is effective for reducing the magnitude of road shock transmitted to the vehicle frame because it improves the ability of the wheel to pass over obstructions frequently encountered on roadway surfaces. The advantages resulting from the trailing relationship of the wheel to the frame are clearly analogous to the advantages of pulling, as compared to pushing, a loaded wheelbarrow over rough ground or over an obstruction in the path of the wheel of the barrow. Moreover, the generally longitudinal positions of axes 35 and 40 produce in spring suspension A, the trailing relationship between wheel 30 and the vehicle frame such that brake reaction forces or driving reaction forces resulting from braking forces or driving forces applied to wheel 30 are absorbed by the frame without producing forces tending to twist spring element 20'; hence, braking or driving forces do not influence the relative position of member 18 with respect to the vehicle frame.

While torque arms 22' and 23' are constructed and mounted on the ends of spring element 20' in the same manner described for arms 22 and 23 on spring element 20, it is also to be noted that torque arms 22' and 23' are bolted to crossmember 46 and pivot arm 42, respectively, by bolts 52 to facilitate spring adjustment or complete removal of the spring element without removing suspension member 18 from pivotal connections 44 and 45. Other means of supporting spring element 20' in its proper position will become apparent from different embodiments hereinafter described.

In Figs. 4, 5, and 6 there is illustrated a spring suspension system identified by reference letter B which employs a torsion spring similar in structure and function to element 20 of Fig. 1, and which like system A, is adaptable, in general, for use in wheeled vehicles and in particular for use with the rear driving wheels of an automotive vehicle. As applied to a left-rear driving wheel schematically represented by a circular line 54, system B is a spring suspension means hingedly disposed about an axis 55 longitudinally associated with a vehicle frame having a lengthwise axis 32' and a left-rear side portion 56 such as to resiliently connect end 58a of a wheel-supporting rear axle housing 58 to the vehicle frame, and such that the wheel-supporting axle housing is movable up and down relative to the frame in a generally vertical plane extending transversely of said frame.

System B is a generally triangular structure comprising a suspension member 60 having a pair of divergent pivot arms 61 and 62 extending from a junction 63 to spaced-apart axially-aligned pivotal connections 64 and 65 with brackets 66 and 67, respectively, of which bracket 66 is riveted to frame side-portion 56 and bracket 67 is fixedly mounted on a frame crossmember 68; and a generally cylindrical split walled tubular spring element 70 disposed between the pivotal connections 64 and 65 such that the longitudinal axis of the spring element is aligned with the axes of the pivotal connections. In Figs. 5 and 6, it is seen that the location of brackets 66 and 67 relative to the rear side portion 56 of the vehicle frame, position pivotal connections 64 and 65 such that axis 55 is obliquely disposed with respect to a vertical plane extending through axis 32' of the vehicle frame for providing a trailing relationship between wheel 54 (as supported by rear axle housing 58) and the vehicle frame.

According to Fig. 5, pivotal connection 64 is effected by means of a stub shaft 72 having a cylindrical portion 73 of reduced diameter in rotative engagement with a bore in the distal end of pivot arm 61 and a threaded shank 74 tightly held in an opening 75 of bracket 66 by a nut 76; while pivotal connection 65 is effected by means of a rotative engagement between a bore 79 in bracket 67 and a pintle 80 projecting from one side of the distal end of pivot arm 62, which pintle is provided with a nut 81 to minimize end play in the rotative engagement.

Spring element 70 is supported between pivotal connections 64 and 65 such that the axes of these connections and the longitudinal axis of the spring element are coincident with hinging axis 55. This supported condition of element 70 is effected by stub shaft 72 of connection 64, which is slidably received by end 70a of the spring element, and by means axially aligned with pintle 80 of connection 65 such as a boss 82 formed on and projecting from the other side of the distal end of pivot arm 62, which boss is slidably received by the other end 70b of the spring element.

Torsional deflection of spring element 70 in direct proportion to pivotal movement of suspension member 60 about axis 55 results from a nonrotating relationship between spring element 70 and bracket 66 of the vehicle frame, and a driving relationship between element 70 and pivot arm 62 of suspension member 60. The non-rotating relationship is effected by a stationary torque arm 84 having a bored end radially embracing end 70a of the element, and by a cap screw 85 extending through radial openings in the bored end of the torque arm and element end 70a into a threaded engagement with stub shaft 72; while the driving relationship is effected by a cap screw 86 extending through a radial opening in a collar 87 radially embracing end 70b of the spring element and a radial opening in said end 70b into a threaded engagement with boss 82, all according to similar structure shown in Figs. 10 and 11 hereinafter described. It is to be noted that stationary torque arm 84 may be located in a different radial position about axis 55 by shifting bolt 88 to a different hole of the group of holes 89 radially disposed about opening 75 in bracket 66. It is to be further noted that collar 87 and the bored end of torque arm 84 radially embrace their respective ends of element 70 such as to prevent radial spreading of the split wall of the element ends in the regions where twisting forces are applied to the spring element, and that the radial openings in ends 70a and 70b of spring element 70 are located substantially diametrically opposite the slot in the cylindrical wall of the spring element, as indicated in Figs. 10 and 11.

According to Figs. 4 and 5, junction 63 of pivot arms 61 and 62 is a structurally sturdy portion of suspension member 60 designed to include a pivot pin 90 projecting in the same direction as pintle 80 such that the central axis of the pivot pin is substantially parallel with the axis of the pintle. Rotatably receiving pin 90 is a shackle or linkage 92 pivotally connected to an end of axle housing 58 by means of a shackle bolt 93 and a pillow block 94 rigidly mounted on top of end 58a such that the axis of bolt 93 is in parallel relationship with respect to the axis of pin 90 and axis 55 of suspension member 60. Linkage 92 constitutes a pivotal connection between suspension member 60 and end 58a of the wheel-supporting axle housing 58, which compensates for any lateral movement of pin 90 resulting from rotary action of the suspension member about axis 55 and prevents undesirable movement of the axle housing relative to the vehicle frame, in a lateral direction.

Because of the above-described construction of spring suspension system B, movement of end 58a of axle housing 58 relative to the vehicle frame is not only confined to a generally vertical plane extending transversely of the frame, but the advantages of a trailing relationship between wheel 54 and said frame are provided because of the oblique relationship between hinging axis 55 of the suspension member 60 and the longitudinal axis 32' of the vehicle; thus, under conditions of forward motion, wheel 54 is pulled over shock-producing roadways.

Another spring suspension system identified by reference letter C is illustrated in Figs. 7 through 13, which is also characterized by a tubular torsion spring similar in structure and function to spring element 20 of Fig. 1, and which, like system A and B is adaptable for use in wheeled vehicles, particularly those employing wheel-supporting axles of the stationary or driving varieties, or a combination of these varieties, disposed transversely in tandem relationship under the load-supporting structures of the vehicles.

For purposes of description, spring suspension C is shown connecting respective ends 100a and 101a of tandemly arranged wheel-supporting axles 100 and 101 to a vehicle frame having a side member 102 and a longitudinal axis 103, such that the axles are disposed transversely of the vehicle frame at substantially right angles with respect to the frame axis 103, and such that wheels 104 and 105 (schematically represented by circular lines in Fig. 7 and fragmentary outlines in Fig. 8) resiliently support the load-carrying vehicle frame. As seen in Figs. 7 and 8 a tubular spring element 106 having a longitudinally slotted generally cylindrical wall and a central axis 107 is supportingly coupled to frame side member 102 by a bracket 108 (see Figs. 12 and 13) having portions 108a, 108b, and 108c circumaxially embracing the wall of the spring element so as to allow rotation of the latter, and portions 108d, 108e, and 108f secured to the frame side member such that element axis 107 lies in a generally vertical plane extending lengthwise of the vehicle frame at an oblique angle to frame axis 103. Disposed on opposite sides of spring element 106 are suspension members 110 and 110' (Figs. 8 and 9) having portions 111 and 111' provided with divergent pivot arms 112, 113 and 112', 113' having distal ends 114, 115 and 114', 115', respectively, of which the distal ends are constructed to circumaxially embrace the spring element such as to permit relative movement therebetween.

Force-transmitting connections between the ends of spring element 106 and suspension members 110 and 110' are illustrated by the enlarged views in Figs. 10 and 11, where a cap screw 116 is shown extending through radial openings in distal end 114 of arm 112 and the respective end of spring element 106 into a threaded engagement with an alignment plug 118. The structures shown in Figs. 10 and 11 are not only typical of the driving connections between the ends of element 106 and members 110 and 110', but they are also representative of the connections employed at the ends of tubular spring element 70 previously described in connection with suspension system B shown in Figs. 4 through 6. In other words, sectional views taken on planes passing through the longitudinal axes of cap screws 85 and 86 would be substantially the same as Figs. 10 and 11, and would show the axes of the cap screws diametrically aligned with the slot in the wall of spring element 70.

Portions 111 and 111' of suspension members 110 and 110' are designed to include pivot pins 120 and 120' having central axes substantially parallel with axis 107 of spring element 106. Rotatably receiving pins 120 and 120' are shackles or linkages 122 and 122' pivotally connected to wheel-supporting axles 100 and 101 by means of shackle bolts 123, 123' and pillow blocks 124, 124' rigidly mounted on top of axle ends 100a and 101a, respectively, such that the axes of the shackle bolts are parallel with axis 107 and the axes of pivot pins 120 and 120'. The shackles or linkages 122 and 122' constitute means providing pivotal connections between suspension members 110, 110' and ends 100a and 101a of the wheel-supporting axles, which compensate for any lateral movements of pins 120 and 120' resulting from rotary actions of these suspension members about axis 107, and prevent undesirable movement of axles 100 and 101 in lateral direction with respect to the vehicle frame. Furthermore, the above described construction of spring suspension system C not only operates to confine relative movement between the wheel-supporting axles and the frame of the vehicle to generally vertical and substantially parallel planes extending transversely of said frame, but it also affords a trailing relationship between one of the axles and the vehicle frame regardless of the direction of vehicle motion, because of the oblique disposition of axis 107 with respect to the longitudinal frame axis 103.

Another unique feature of spring suspension system C resides in its ability to provide an equal distribution of weight to wheels 104 and 105 mounted on the ends of axles 100 and 101. This ability results from an equalizing relationship afforded by the rotatably supported condition of torsion spring element 106 in portions 108a, 108b, and 108c of bracket 108; hence the weight of the vehicle load-supporting structure is transmitted to the axles and wheels by the spring element and the bracket as twisting forces applied to the ends of said spring element in opposite directions about element axis 107, which twisting forces are of equal magnitude because of the dimensional similarity between suspension members 110 and 110'.

Although the drawings show only a portion of one side of the load-carrying wheeled vehicles embodying suspension systems A, B, and C, it is to be understood from the foregoing descriptions of the several figures that the structures disclosed also constitute the spring suspension means connecting the right-front and right-rear wheel supporting structures to the vehicle frames in the cases of systems A and B, respectively, and the spring means connecting the other ends of the wheel-supporting tandem axles to the vehicle frame in the case of system C. Moreover, it should be understood that system A is equally well adapted for use in connection with individually suspended driving wheels or with combination driving and dirigible wheels; whereas systems B and C are equally well adapted to both driving and stationary wheel-supporting axles, or in the case of system C, to a combination of a driving and a stationary wheel supporting axle.

Another important feature of the present invention resides in the fact that reaction forces in suspension systems A, B, and C resulting from braking and/or driving forces applied to the wheels of the vehicles are transmitted directly to the frames of the vehicles without producing torsional deflections in the respective tubular spring elements. This absence of torsional deflection provides a distinct advantage, since it precludes the storage of energy in the springs by the braking or driving forces applied to the wheels and the concomitant release or feeding back of such energy to the wheels as is the case in conventional suspension systems. In this connection, it is pointed out that feed-back energy is a heavy contributor to the destructive chatter occurring during clutching and/or braking operations of transportation vehicles.

From the foregoing description, it is seen that suspension members 18, 60, and 110, 110' cooperate with spring elements 20', 70 and 106, each having a generally cylindrical wall with a longitudinally extending slot the full length of the wall, to provide structurally and functionally similar spring suspension systems A, B, and C, respectively, which are variously adaptable for use in a variety of vehicles having different types of wheel-supporting axles. Moreover, these systems are also characterized by other similar advantages such as, simple and sturdy design, reduced manufacturing costs, elimination of spring deflection caused by braking and driving forces applied to the wheels, elimination of brake and clutch chatter caused by the feed-back to the wheels of energy stored in the springs, a trailing condition of the wheels to minimize road shock, a structural condition wherein most of the suspension system weight is added to the sprung weight of the vehicle, and adaptability to a wide range of vehicle construction.

For the sake of simplicity, a single tubular spring element has been shown in each of the three systems disclosed, however, it is to be understood that each system may employ two or more tubular elements of the character described by arranging such elements in telescoped relationship about a common axis and, depending upon the results desired, connecting the telescoped elements in series or in parallel without departing from the spirit or scope of this invention. It is to be further understood that spring elements constructed as tubes having overlapping but unconnected wall portions may be employed when desired, and that such tubes are considered within the scope of the meaning intended for split-walled tubes.

What is claimed as new is:

1. In a vehicle having wheel and load-carrying structures with spring suspension means interconnecting said wheel and load-carrying structures such that the load-carrying structure is resiliently supported by the wheel structure, said spring suspension means comprising: a torsionally flexible tubular spring element having a generally cylindrical wall; said wall being structurally continuous except for a single wall-separating slot extending longitudinally of said spring element from end to end, and said wall-separating slot being such that the torsional flexibility of said spring element is characterized by longitudinal relative movement without rubbing contact between the slot-forming wall portions accompanied by concurrent tendencies of said slot-forming wall portions to move radially at the ends of said spring element when opposing forces are twistingly applied to said element at two locations on the generally cylindrical wall; a suspension member having a first portion coupled to the wheel-structure, and spaced second and third portions hingedly coupled to the load-carrying structure along a hinging axis for up and down movement of the wheel structure relative to the load-carrying structure; means interconnecting said tubular spring element between the load-carrying structure and said suspension member such that weight of the load-carrying structure is transmitted to the wheel structure as forces twistingly applied to said spring element, said interconnecting means comprising first and second devices nonrotatably connected in axially spaced locations to the slotted generally cylindrical wall of the spring element for applying the twisting forces thereto such that the characterizing longitudinal relative movement between the slot-forming wall portions is effected throughout the length of said element when said twisting forces are applied, said first and second devices being respectively mounted on the load-carrying structure and on one of the second and third portions of said suspension member such that up and down movement of the wheel structure relative to said load-carrying structure causes relative angular movement between the first and second devices about the hinging axis of said suspension member; and means circumferentially embracing the slotted generally cylindrical wall of the spring element at the ends thereof such that radial movements of the slot-forming portions of said wall are precluded at said spring element ends when twisting forces are applied to said spring element by the first and second devices.

2. The spring suspension means defined in claim 1 wherein the first device of the interconnecting means is supportedly connected to the load-carrying structure in the region of the hinged connection between said structure and the other of said suspension member second and third portions.

3. The spring suspension means defined in claim 1 in which one of the first and second devices of the interconnecting means includes a portion so constructed and arranged as to constitute the means circumferentially embracing the slotted generally cylindrical wall at one end of the tubular spring element.

4. The spring suspension means defined in claim 1 in which the first and second devices of the interconnecting means include portions so constructed and arranged as to constitute the means circumferentially embracing the slotted generally cylindrical wall at the ends of the tubular spring element.

5. The spring suspension means defined in claim 1 wherein the first and second devices of the interconnecting means are nonrotatably connected to the generally cylindrical wall at the ends of the tubular spring element such that application of twisting forces to said element is effected in substantially diametric opposition to the slot in said wall.

6. The spring suspension means defined in claim 1 wherein one of the first and second devices of the interconnecting means is nonrotatably connected to one end of the tubular spring element by a force-transmitting element extending through a radial opening in the generally cylindrical wall in substantially diametric opposition to the slot in said wall.

7. In a vehicle having wheel and load-carrying structures interconnected by spring suspension means such that the load-carrying structure is resiliently supported by the wheel structure, said spring suspension means comprising: a torsionally flexible tubular spring element having a generally cylindrical wall and a longitudinal axis, said wall being structurally continuous except for a single wall-separating slot extending longitudinally of said spring element from end to end, said wall-separating slot being such that the torsional flexibility of said spring element is characterized by longitudinal relative movement without rubbing contact between the slot-forming wall portions accompanied by concurrent tendencies of said slot-forming wall portions to move radially at the ends of said spring element when opposing forces are twistingly applied to said element at two locations on the generally cylindrical wall, and said tubular spring element being supported from the load-carrying structure such that its longitudinal axis is fixed with respect to said structure, and such that its characterizing torsional flexibility is accommodated; first means nonrotatably connected to the tubular spring element and mechanically associated with the wheel and load-carrying structures such that weight of the load-carrying structure is transmitted to the wheel structure as forces twistingly applied to said spring element at two locations along the slotted generally cylindrical wall thereof such that the characterizing torsional flexibility of said spring element is maintained, said first means including a pair of force-transmitting arms having first end portions coupled to the wheel structure and second end portions hingedly associated with the load-carrying structure such that said second end portions are disposed a distance apart and their hinging axes are substantially aligned with the longitudinal axis of the spring element, the second end portion of one of said arms being nonrotatably connected to said spring element at one of the two locations on the generally cylindrical wall thereof, and the second end portion of the other of said arms being rotatable relative to said spring element and the load-carrying frame about its own hinging axis; and second means circumferentially embracing the slotted cylindrical wall of said spring element at the ends thereof such that radial movements of the slot-forming portions of said wall are precluded at said spring element ends and such that the longitudinal relative movement between said slot-forming wall portions is unrestricted when twisting forces are applied to said spring element by the first means.

8. The combination defined in claim 7 in which the first means is characterized by a supporting element mounted on the load-carrying structure and having a portion circumferentially embracing the slotted cylindrical wall of the tubular spring element at one end thereof such as to constitute the second means to the extent that radial movements of the slot-forming portions of said wall are precluded at said one spring end when twisting forces are applied to said spring; and in which said first means is further characterized by a nonrotatable connection between said supporting element and said spring element for cooperation with said second end portion of said one arm for applying twisting forces to said spring element, said nonrotatable connection being such that longitudinal relative movement of the slot-forming portions of the spring element walls is unrestricted by said connection when said twisting forces are applied.

9. The combination defined in claim 7 in which the first means is characterized by the fact that the second end portion of said one of said arms is so constructed as to circumferentially embrace the slotted cylindrical wall of the tubular spring element such as to constitute the second means to the extent that radial movements of the slot-forming portions of said wall are precluded at said one end of the spring element and such that longitudinal relative movement of the slot-forming wall portions is unrestricted by said second end portion when twisting forces are applied by said first means.

10. The combination defined in claim 7 in which the first means is characterized by the fact that the second end portions of the pair of force-transmitting arms circumferentially embrace the slotted cylindrical wall of the tubular spring element a distance apart from each other along said wall such that the axes of said second end portions are coincident with the longitudinal axis of said tubular spring element and such that one of said second end portions is disposed at one end of said spring element thereby constituting the second means to the extent that radial movements of the slot-forming portions of said cylindrical wall are precluded; and by the fact that said one second end portion is nonrotatably connected to said one end of the tubular spring element for applying twisting forces thereto such that longitudinal relative movement of the slot-forming wall portions of the spring element wall is unrestricted.

11. The combination defined in claim 7 in which the first means is characterized by first and second pairs of force-transmitting arms, each pair of arms having first end portions coupled to the vehicle wheel structure and second end portions hingedly associated with the load-carrying structure such that the second end portions of each pair of arms circumferentially embrace the slotted cylindrical wall of the tubular spring element and are disposed a distance apart from each other along said slotted wall with their axes coincident with the longitudinal axis of said spring element, one second end portion of one arm of each pair of arms being nonrotatably connected to one end of the tubular spring element for applying twisting forces to said spring element at the two locations along the slotted cylindrical wall such that radial movements of the slot-forming portions of said wall are precluded and longitudinal relative movement between said slot-forming portions is unrestricted when twisting forces are applied by the two pairs of arms.

12. The combination defined in claim 7 in which the first means includes nonrotatable connections with the generally cylindrical wall of the spring element at two locations substantially diametrically opposite the wall-separating slot, at least one of said two locations being adjacent one end of said spring element.

References Cited in the file of this patent

UNITED STATES PATENTS

| | | |
|---|---|---|
| 2,173,974 | Leighton | Sept. 26, 1939 |
| 2,232,173 | Frohlich | Feb. 18, 1941 |

FOREIGN PATENTS

| | | |
|---|---|---|
| 451,490 | Great Britain | Aug. 6, 1936 |
| 806,889 | France | Oct. 5, 1936 |
| 872,258 | France | June 3, 1942 |
| 749,208 | Germany | Nov. 17, 1944 |